United States Patent
Kouzuma et al.

(10) Patent No.: US 9,927,830 B2
(45) Date of Patent: Mar. 27, 2018

(54) REACTION FORCE OUTPUT DEVICE

(71) Applicants: HONDA LOCK MFG. CO., LTD., Miyazaki-shi, Miyazaki (JP); HONDA MOTOR CO., LTD., Minato-ku, Tokyo (JP)

(72) Inventors: Hiroyuki Kouzuma, Miyazaki (JP); Kohei Hirotani, Miyazaki (JP); Hideto Nebuya, Utsunomiya (JP); Ayumu Yamaguchi, Utsunomiya (JP); Go Suzaki, Utsunomiya (JP); Kohei Maruyama, Utsunomiya (JP)

(73) Assignees: Honda Lock Mfg. Co., Ltd., Miyazaki (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/027,332

(22) PCT Filed: Sep. 17, 2014

(86) PCT No.: PCT/JP2014/074586
§ 371 (c)(1),
(2) Date: Apr. 5, 2016

(87) PCT Pub. No.: WO2015/053056
PCT Pub. Date: Apr. 16, 2015

(65) Prior Publication Data
US 2016/0239041 A1    Aug. 18, 2016

(30) Foreign Application Priority Data
Oct. 8, 2013 (JP) .................................. 2013-211110

(51) Int. Cl.
G05G 5/03 (2008.04)
G05G 1/44 (2008.04)
B60K 26/02 (2006.01)

(52) U.S. Cl.
CPC ............ *G05G 5/03* (2013.01); *B60K 26/021* (2013.01); *G05G 1/44* (2013.01); *B60K 2026/023* (2013.01)

(58) Field of Classification Search
CPC ................................ B60K 26/021; G05G 5/03
(Continued)

(56) References Cited

U.S. PATENT DOCUMENTS

2013/0091977 A1*    4/2013    Fukushima .......... B60K 26/021
74/513

FOREIGN PATENT DOCUMENTS

EP         2 578 431 A1    4/2013
JP         2006-281802 A   10/2006
(Continued)

OTHER PUBLICATIONS

PCT/ISA/210 from PCT/JP2014/074586 with the English translation thereof.

*Primary Examiner* — William Kelleher
*Assistant Examiner* — Randell J Krug
(74) *Attorney, Agent, or Firm* — Carrier Blackman & Associates, P.C.; William D. Blackman; Jingli Wang (57) ABSTRACT

A reaction force output device includes: a motor that is a drive source that creates a reaction force; a reaction force output shaft that interlocks with an output shaft of the motor to rotate; and an interlocking arm that transmits output torque of the motor which is input to the reaction force output shaft to an operation pedal. A torque limiting mechanism, which limits the transmission of torque that is equal to or greater than a specified value between the reaction force output shaft and the interlocking arm, is interposed between the reaction force output shaft and the interlocking arm.

5 Claims, 5 Drawing Sheets

(58) Field of Classification Search
USPC .................................. 74/513, 512, 514, 560
See application file for complete search history.

(56) References Cited

FOREIGN PATENT DOCUMENTS

| JP | 2008-222031 A | 9/2008 |
|----|---------------|--------|
| JP | 2010-003164 A | 1/2010 |
| JP | 2010-111379 A | 5/2010 |
| JP | 2011-251667 A | 12/2011 |

* cited by examiner

REACTION FORCE OUTPUT DEVICE

TECHNICAL FIELD

The present invention relates to a reaction force output device that outputs a reaction force to an operation pedal such as an accelerator pedal of a vehicle.

Priority is claimed on Japanese Patent Applications No. 2013-211110, filed on Oct. 8, 2013, the contents of which are incorporated herein by reference.

BACKGROUND ART

To inhibit an accelerator pedal from being depressed more than necessary when a vehicle is started or while it is traveling, an accelerator pedal device that gives a reaction force corresponding to a depressed state to the accelerator pedal has recently been developed (e.g., see Patent Literature 1).

In the accelerator pedal device described in Patent Literature 1, a return spring for returning a pedal arm to an initial position, a motor for generating a reaction force, and an interlocking arm for transmitting rotation of the motor to the pedal arm are installed in a housing that pivotably supports a base end of the pedal arm. This accelerator pedal device is configured such that the motor is controlled to an output corresponding to a depressed state of the accelerator pedal by a control unit, and the output is given to the pedal arm through the interlocking arm.

CITATION LIST

Patent Literature

[Patent Literature 1]
Japanese Unexamined Patent Application, First Publication No. 2010-111379

SUMMARY OF INVENTION

Technical Problem

However, in the accelerator pedal device described in Patent Literature 1, since a rotating shaft of the motor and the interlocking arm has a structure in which they are always interlockably connected, when a great force obstructing the rotation of the motor is applied for any reason, there is concern that excessive internal stress is applied to the motor or a torque transmitting mechanism part between the interlocking arm and the motor by a pedaling force of the pedal which is input to the interlocking arm.

Thus, an aspect according to the present invention is directed to providing a reaction force output device capable of inhibiting excessive internal stress from acting on a motor or a torque transmitting mechanism part between an interlocking arm and the motor.

Solution to Problem

To solve the problem, a reaction force output device according to the present invention employs the following constitutions.

(1) An aspect according to the present invention is a reaction force output device that outputs a reaction force to an operation pedal, the reaction force output device including: a motor that is a drive source generating the reaction force; a reaction force output shaft configured to interlock with an output shaft of the motor to rotate; an interlocking arm configured to transmit output torque of the motor which is input to the reaction force output shaft to the operation pedal; and a torque limiting mechanism interposed between the reaction force output shaft and the interlocking arm and configured to limit transmission of torque that is equal to or greater than a specified value between the reaction force output shaft and the interlocking arm.

According to the aspect of (1), during a normal operation during which the torque acting between the reaction force output shaft and the interlocking arm does not meet the specified value, since the torque limiting mechanism does not limit the transmission of the torque, torque of the motor which resists a pedaling force of the operation pedal is transmitted to the interlocking arm. Also, if the torque acting between the reaction force output shaft and the interlocking arm is equal to or greater than the specified value, for instance, due to application of any great force obstructing rotation of the motor, the torque limiting mechanism limits the transmission of the torque to inhibit excessive internal stress from acting on the motor or the torque transmitting mechanism part between the interlocking arm and the motor.

(2) In the aspect of (1), the interlocking arm may have a pivotal part rotatably supported on the reaction force output shaft, and a gear part provided on a region separated from the pivotal part, and the torque limiting mechanism may include an action transmission lever connected via the reaction force output shaft to be rotatable relative to the interlocking arm, a rotary gear connected via a support shaft to be rotatable relative to the action transmission lever and always engaged with the gear part of the interlocking arm, and a spring member interposed between the action transmission lever and the rotary gear and elastically deformed to allow rotation of the rotary gear relative to the action transmission lever when torque acting on the rotary gear through the gear part is equal to or greater than a predetermined value.

In the case of (2), if the motor is driven, the action transmission lever and the rotary gear are prone to gyrate about the reaction force output shaft along with rotation of the reaction force output shaft. At this time, since the rotary gear is engaged with the gear part of the interlocking arm, the pedaling force of the operation pedal acts on the rotary gear via the interlocking arm.

Also, when rotating torque acting on the rotary gear via the gear part does not meet a predetermined value, the spring member holds the rotary gear in a non-rotation state, and a position at which the gear part and the rotary gear are engaged is constantly maintained.

Accordingly, at this time, the interlocking arm and the reaction force output shaft rotate as one body, and the torque is transmitted between the interlocking arm and the motor with no change without limiting the transmission of the torque. On the other hand, if the rotating torque acting on the rotary gear via the gear part is equal to or greater than the predetermined value, the spring member is elastically deformed. Accordingly, the rotary gear rotates relative to the action transmission lever, and the position at which the gear part and the rotary gear are engaged is displaced. At this time, the interlocking arm and the reaction force output shaft perform relative pivoting, and the transmission of the torque is limited between the interlocking arm and the motor. Therefore, the torque limiting mechanism can inhibit excessive torque from being transmitted between the interlocking arm and the motor with a compact and simple structure.

(3) In the aspect of (2), the spring member may be formed of a power spring.

In the case of (3), since a spring constant of the power spring can easily be set to be small compared to, for instance, a coil spring, it is easy to greatly secure a pivoting stroke of the interlocking arm relative to the reaction force output shaft for the purpose of torque limitation when the rotating torque acting on the rotary gear is equal to or greater than the predetermined value.

Advantageous Effects of Invention

According to the aspect of the present invention, since the torque limiting mechanism, which limits the transmission of the torque that is equal to or greater than the specified value between the reaction force output shaft and the interlocking arm is provided between the reaction force output shaft and the interlocking arm, it is possible to inhibit excessive internal stress from acting on the motor or the torque transmitting mechanism part between the interlocking arm and the motor.

DESCRIPTION OF EMBODIMENTS

Hereinafter, an embodiment of the present invention will be described on the basis of the drawings.

Figure 1:
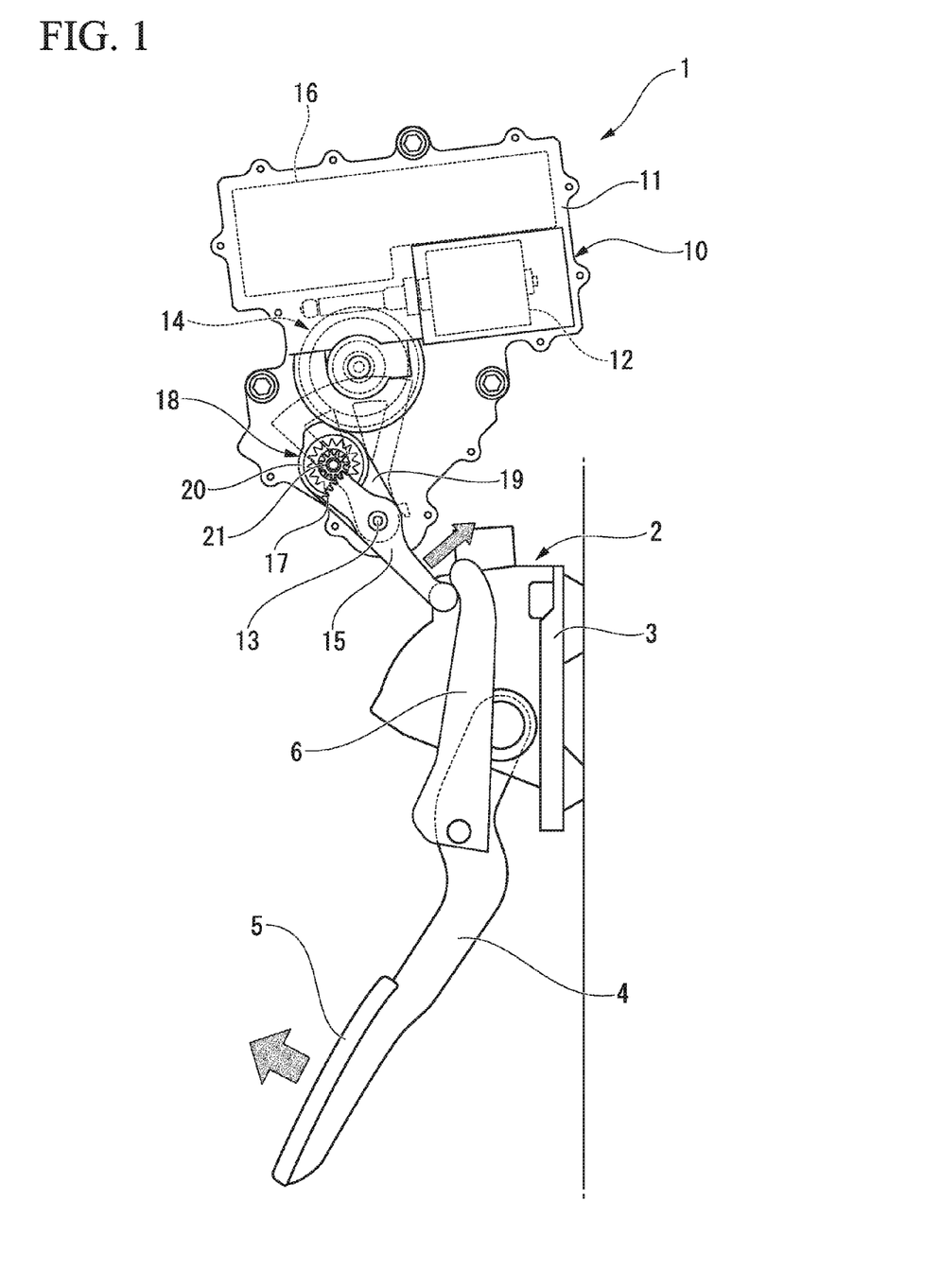
FIG. 1 is a view illustrating an accelerator pedal device that uses a reaction force output device according to an embodiment of the present invention.

FIG. 1 is a view illustrating an accelerator pedal device 1 of a vehicle which employs a reaction force output device 10 according to this embodiment.

The accelerator pedal device 1 is equipped with a pedal body unit 2 installed in front of a footing for a driver seat, and a reaction force output device 10 installed at a position above the pedal body unit 2 in front of the footing for the driver seat.

The pedal body unit 2 is equipped with a holding base 3 mounted on a vehicle body, a pedal arm 4 of which a base end is pivotably supported on the holding base 3, and a pedal body part 5 which is provided on a front surface of a tip side of the pedal arm 4 and to which a pedaling force is given by a driver. A return spring (not illustrated), which always biases the pedal arm 4 to an initial position, is provided for the holding base 3. A cable (not illustrated) for operating a degree of opening of a throttle valve (not illustrated) in an internal combustion engine according to an amount of operation (pivotal angle) of the pedal arm 4 is connected to the pedal arm 4. However, when an electronic control throttle is used in the internal combustion engine, the pedal body unit 2 may be provided with a rotation sensor for detecting the pivotal angle of the pedal arm 4, and the degree of opening of the throttle valve may be configured to be controlled on the basis of a detected signal of the rotation sensor. Also, a reaction force transmission lever 6 extending in a direction that is roughly opposite to a direction in which the pedal arm 4 extends is integrally coupled in the vicinity of the base end of the pedal arm 4.

In this embodiment, the pedal arm 4 and the pedal body part 5 constitute an operation pedal.

Figure 2:
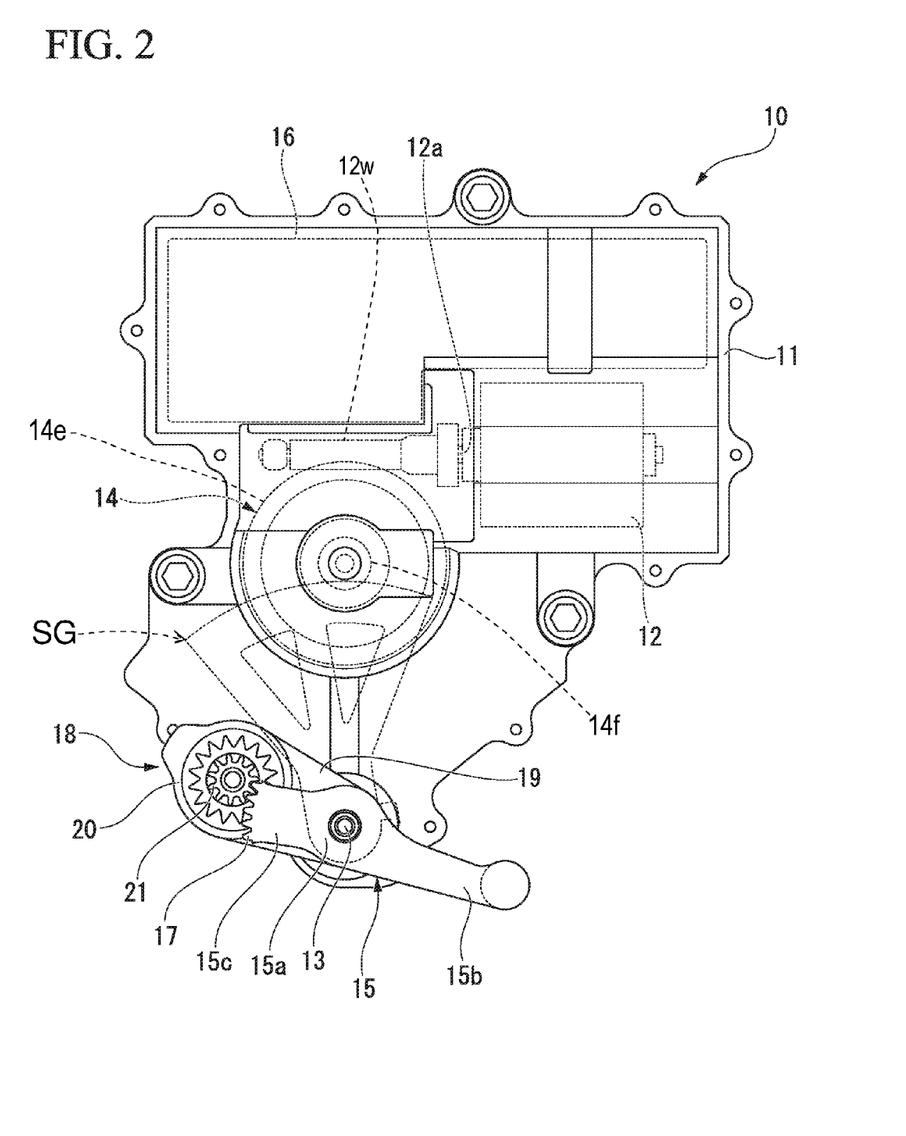
FIG. 2 is a side view of the reaction force output device of the embodiment of the present invention.
Figure 3:
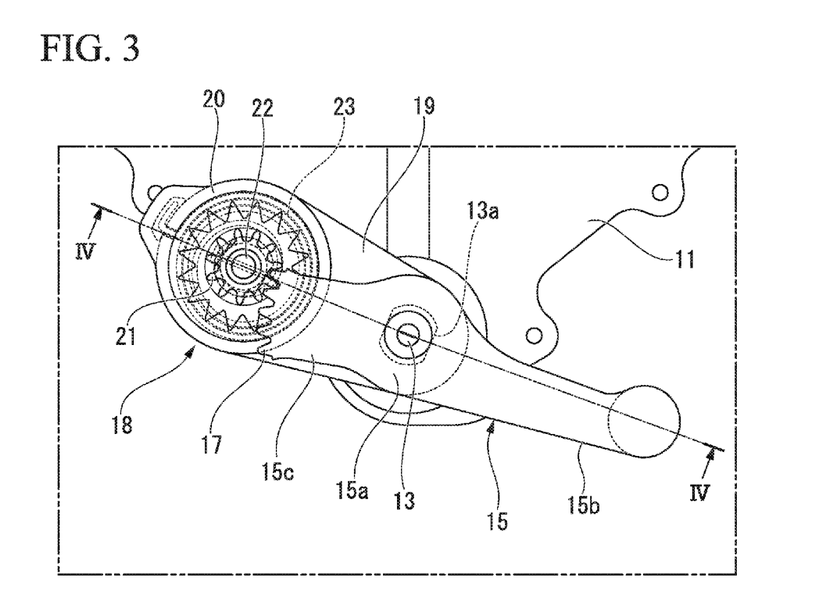
FIG. 3 is an enlarged side view of main parts of the reaction force output device of the embodiment of the present invention.

FIG. 2 is a view illustrating the entirety of the reaction force output device 10. FIG. 3 is a view in which main parts of the reaction force output device 10 are enlarged and illustrated. The reaction force output device 10 is equipped with a motor 12 that is a drive source for generating a reaction force, a reaction force output shaft 13 that is pivotably supported by the housing 11, and a reduction mechanism 14 that increases torque reducing rotation of a rotating shaft 12a of the motor 12 to transmit it to the reaction force output shaft 13. A worm gear 12w is mounted on the rotating shaft 12a, and this gear engages with an engagement sprocket 14e of the reduction mechanism 14, as shown. An output gear 14f of the reduction mechanism 14 engages a sector gear SG, which is mounted on the reaction force output shaft 12, as shown. One end of the reaction force output shaft 13 protrudes outwardly in an axial direction from a lateral surface of the housing 11, and an interlocking arm 15 is pivotably connected to the protruding end. The interlocking arm 15 is equipped with a pivotal part 15a that is pivotably supported by the end of the reaction force output shaft 13, an arm main body part 15b that extends outward from the pivotal part 15a in a radial direction of the reaction force output shaft 13, and a torque transmission segment 15c that extends from the pivotal part 15a to the opposite side of the arm main body part 15b. As illustrated in FIG. 1, a tip portion of the arm main body part 15b is configured to be able to come into contact with the reaction force transmission lever 6 of the pedal body unit 2 in a pivoting direction. The arm main body part 15b and the reaction force transmission lever 6 come into contact with each other when the pedal body part 5 is depressed by a driver. Also, an extension end of the torque transmission segment 15c is formed in an arc shape whose center is a rotational center of the pivotal part 15a, and serves as a gear part 17 in which a plurality of engaging teeth are formed at an arc portion thereof. A sign 16 in FIGS. 1 and 2 refers to a circuit board on which a control circuit for driving the motor 12 is mounted.

Figure 4:
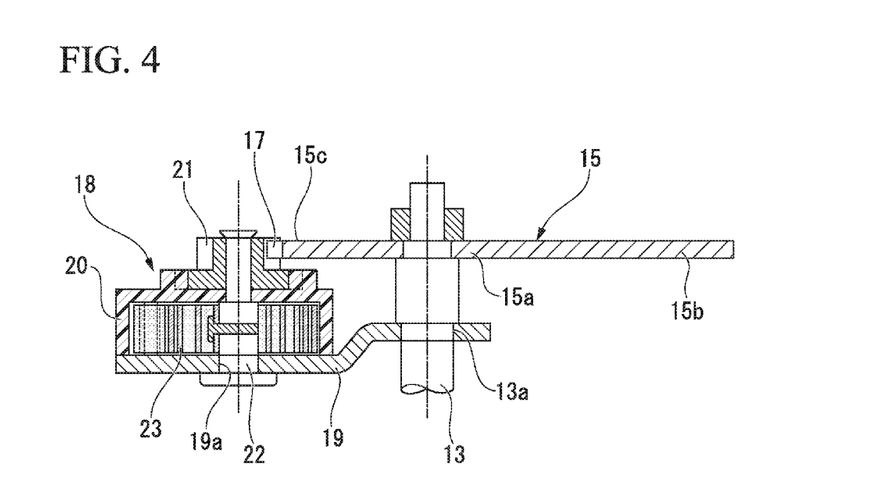
FIG. 4 is a sectional view corresponding to a cross section taken along line IV-IV of FIG. 3 in the reaction force output device of the embodiment of the present invention.

FIG. 4 is a view illustrating a cross section of the reaction force output device 10 which corresponds to a cross section taken along line IV-IV of FIG. 3.

As illustrated in FIGS. 3 and 4, a torque limiting mechanism 18, which limits the transmission of torque that is equal to or greater than a specified value between the reaction force output shaft 13 and the interlocking arm 15, is disposed between the reaction force output shaft 13 and the interlocking arm 15. The reaction force output shaft 13 and the interlocking arm 15 are connected to enable the transmission of the torque via the torque limiting mechanism 18. The torque limiting mechanism 18 allows the transmission of the torque between the reaction force output shaft 13 and the interlocking arm 15 until the torque acting between the reaction force output shaft 13 and the interlocking arm 15 reaches the specified value, and limits the transmission of the torque that is equal to or greater than the specified value between the reaction force output shaft 13 and the interlocking arm 15 if the torque acting between the reaction force output shaft 13 and the interlocking arm 15 is equal to or greater than the specified value.

An action transmission lever 19, which extends outward from the reaction force output shaft 13 in a radial direction, is integrally connected to a portion adjacent to one end of the reaction force output shaft 13 in the axial direction. The action transmission lever 19 of this embodiment is formed of a metal plate, and is configured to fixedly fit a base end thereof into a width across flats portion 13a of an outer surface of the reaction force output shaft 13, and a non-circular pin fixing hole 19a is formed in a tip side edge thereof. A bottomed cylindrical rotary body 20 is pivotably mounted on a surface on which the tip side edge of the action transmission lever 19 faces the interlocking arm 15 with an opening side thereof directed toward the action transmission lever 19.

A rotary gear 21, which is always engaged with the gear part 17 of the interlocking arm 15, is coaxially mounted on an outer surface of a bottom wall of the rotary body 20. The rotary body 20 and the rotary gear 21 are rotatably supported on a support pin (support shaft) 22 that is mounted on the tip side edge of the action transmission lever 19. The support pin 22 is unrotatably mounted in the pin fixing hole 19a of the action transmission lever 19. The rotary gear 21 of this embodiment has engaging teeth formed throughout an outer circumferential surface of the rotary gear 21, but the engaging teeth may be configured to be formed only at a part of the outer circumferential surface of the rotary gear 21.

Also, a power spring (spring member) 23 for constraining rotation of the rotary gear 21 relative to the action transmission lever 19 is housed in the bottomed cylindrical rotary body 20. An inner circumference side end of the power spring 23 is coupled to the support pin 22, and an outer inner circumference side end of the power spring 23 is coupled to the rotary body 20. When rotation torque acting between the support pin 22 and the rotary body 20 does not meet a predetermined value, the power spring 23 regulates the rotation of the rotary body 20 (rotary gear 21) with respect to the support pin 22 according to spring rigidity thereof. If the rotation torque acting between the support pin 22 and the rotary body 20 exceeds the predetermined value, the power spring 23 starts elastic deformation in a winding direction, and thereby allows the rotation of the rotary body 20 (rotary gear 21) with respect to the support pin 22.

Here, since the rotary gear 21 is supported on the tip side edge of the action transmission lever 19 by the support pin 22, if the reaction force output shaft 13 rotates, the rotary gear 21 gyrates along with the action transmission lever 19 as one body according to such rotation. On the other hand, since the rotary gear 21 is always engaged with the gear part 17 of the interlocking arm 15, if the rotary gear 21 does not rotate about the support pin 22 by itself, the rotary gear 21 gyrates along with the gear part 17 of the interlocking arm 15 as one body. Therefore, if the rotary gear 21 does not rotate, the reaction force output shaft 13 and the interlocking arm 15 gyrate as one body. The spring rigidity of the power spring 23 is set to constrain the rotation of the rotary gear 21 without the elastic deformation during a normal operation during which the torque acting between the reaction force output shaft 13 and the interlocking arm 15 does not meet the specified value, and to allow the rotation of the rotary gear 21 due to the elastic deformation when the torque acting between the reaction force output shaft 13 and the interlocking arm 15 is equal to or greater than the specified value.

The torque limiting mechanism 18 of this embodiment is made up of the gear part 17 of the interlocking arm 15, the action transmission lever 19 that is fixed to the reaction force output shaft 13, the rotary gear 21 that is rotatably supported on the support pin 22 projected from the action transmission lever 19 and is always engaged with the gear part 17, and the power spring 23 that connects the support pin 22 and the rotary gear 21.

Figure 5A:
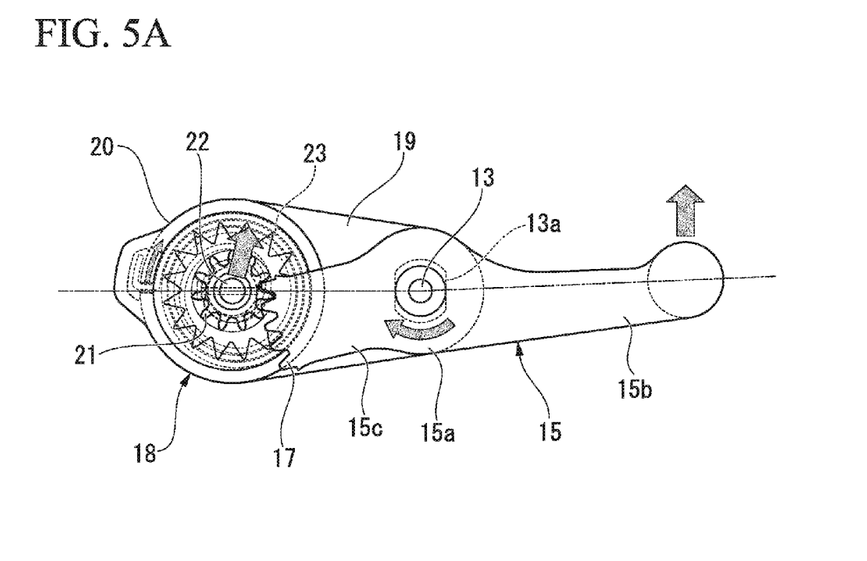
FIG. 5A is a side view illustrating a state of an early stage at which a pedaling force is given in the reaction force output device of the embodiment of the present invention.
Figure 5B:
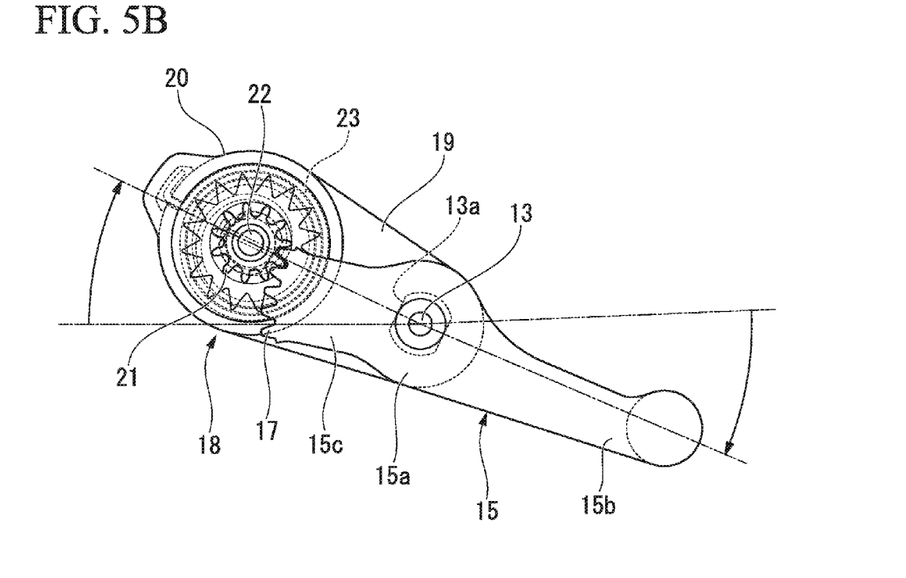
FIG. 5B is a side view illustrating a state of a late stage at which the pedaling force is given in the reaction force output device of the embodiment of the present invention.
Figure 6A:
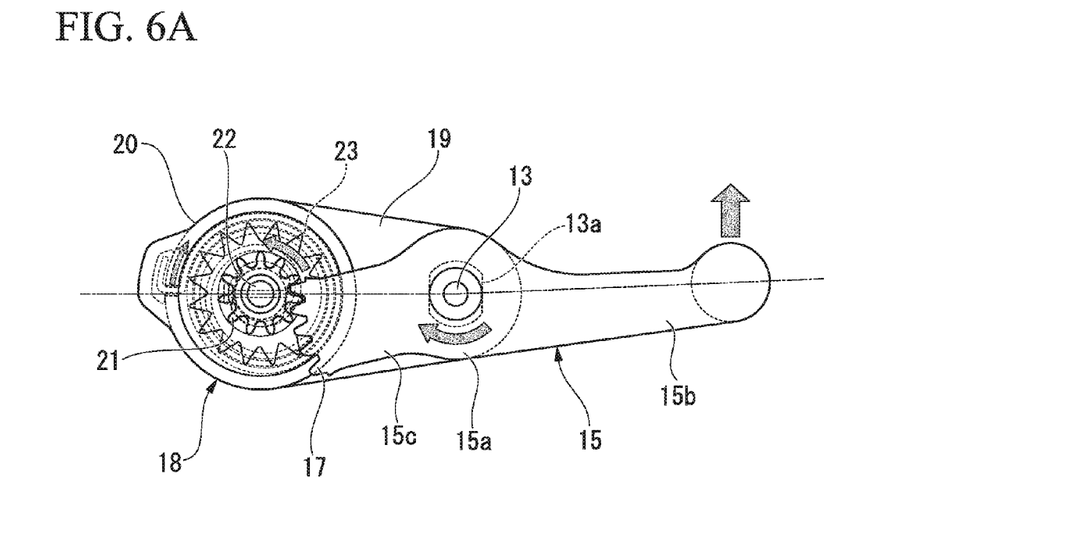
FIG. 6A is a side view illustrating the state of the early stage at which the pedaling force is given in the reaction force output device of the embodiment of the present invention.
Figure 6B:
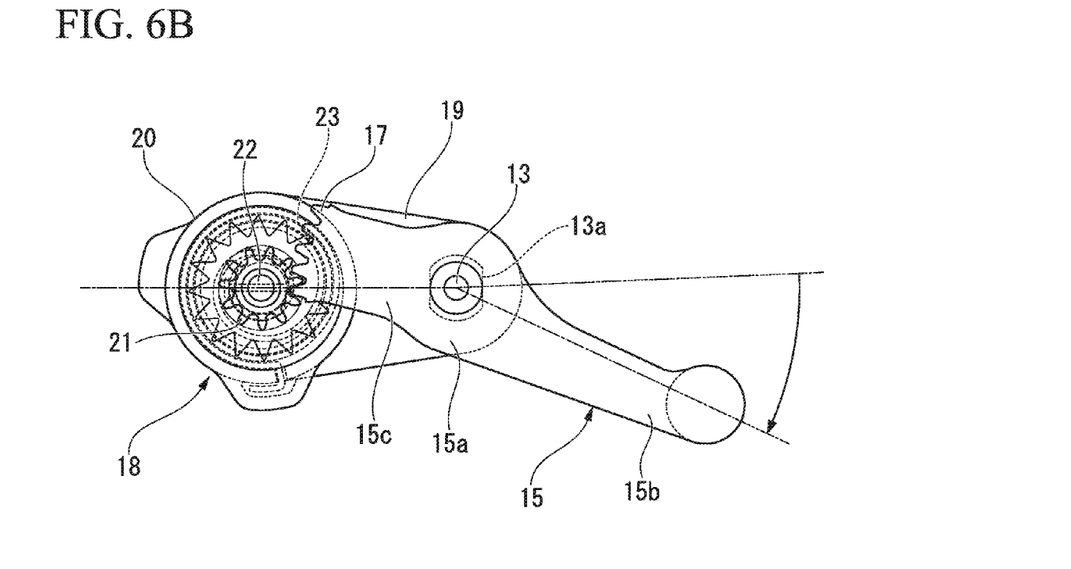
FIG. 6B is a side view illustrating the state of the late stage at which the pedaling force is given in the reaction force output device of the embodiment of the present invention.

Next, an operation of the reaction force output device 10 of this embodiment will be described with reference to FIGS. 5A and 5B and FIGS. 6A and 6B. FIGS. 5A and 5B are views illustrating a state of an early stage at which the pedaling force is given and a state of a late stage at which the pedaling force is given during the normal operation during which the torque acting between the reaction force output shaft 13 and the interlocking arm 15 does not meet the specified value. FIGS. 6A and 6B are views illustrating the state of the early stage at which the pedaling force is given and the state of the late stage at which the pedaling force is given when the torque acting between the reaction force output shaft 13 and the interlocking arm 15 is equal to or greater than the specified value.

As illustrated in FIGS. 5A and 5B, if the pedaling force is input to the interlocking arm 15 from the pedal body unit 2 (see FIG. 1), the interlocking arm 15 pivots about the reaction force output shaft 13 due to the pedaling force, and the rotary gear 21 engaged with the gear part 17 of the interlocking arm 15 gyrates in the same direction as the interlocking arm 15 along with the action transmission lever 19. Accordingly, the reaction force output shaft 13 rotates along with the interlocking arm 15 in one body. At this time, torque corresponding to a depressed state of the pedal body part 5 caused by a driver or a driving speed of the vehicle is input to the reaction force output shaft 13 from the motor 12.

The torque causes the support pin 22, the rotary body 20, and the rotary gear 21 to gyrate along with the action transmission lever 19 as depicted by an arrow in FIG. 5A, and is transmitted to the interlocking arm 15 as torque in a direction opposite to a direction in which the pedaling force is input. As a result, a reaction force is transmitted to the sole of the driver's foot through the pedal body part 5 by the motor 12.

While the depression of the pedal body part 5 is continuously performed in this way by the driver, during the normal operation, the rotary gear gear 21 is held in a non-rotation state by the spring rigidity of the power spring 23 because the torque acting between the reaction force output shaft 13 and the interlocking arm 15 does not meet the specified value. Thereby, a position at which the gear part 17 of the interlocking arm 15 and the rotary gear 21 are engaged is constantly maintained as illustrated in FIG. 5B, and the interlocking arm 15 and the reaction force output shaft 13 integrally rotate without relative rotation. As a result, the torque is transmitted with no change between the reaction force output shaft 13 and the interlocking arm 15 without being limited.

On the other hand, as illustrated in FIGS. 6A and 6B, when the pedal body part 5 (see FIG. 1) is depressed by the driver, if a great force obstructing the rotation of the motor 12 acts for any reason, and the torque acting between the reaction force output shaft 13 and the interlocking arm 15 is equal to or greater than the specified value, the power spring 23 holding the rotary gear 21 starts the elastic deformation in the winding direction, and the rotary gear 21 is prone to rotate as depicted by an arrow in FIG. 6A. Thereby, as illustrated in FIG. 6B, the position at which the gear part 17 of the interlocking arm 15 and the rotary gear 21 are engaged is gradually displaced, and the interlocking arm 15 and the reaction force output shaft 13 cause relative rotation. As a result, the transmission of the torque between the reaction force output shaft 13 and the interlocking arm 15 is limited.

Accordingly, the driver can depress the pedal body part 5 at this time without receiving an excessive reaction force due to the reaction force output device 10.

Also, when the reaction force is controlled by the motor 12 of the reaction force output device 10, even if a great pedaling force is applied against the output of the motor 12 by the driver, the torque acting between the reaction force output shaft 13 and the interlocking arm 15 may be equal to or greater than the specified value. Even in this case, as described above, the transmission of the torque between the reaction force output shaft 13 and the interlocking arm 15 is limited by the torque limiting mechanism 18.

Accordingly, the driver can increase output of an internal combustion engine at this time according to his/her own intention of depressing the pedal without receiving the excessive reaction force.

As described above, since the torque limiting mechanism 18 limiting the transmission of the torque, which is equal to or greater than the specified value, between the reaction force output shaft 13 and the interlocking arm 15 is provided between the reaction force output shaft 13 and the interlocking arm 15, the reaction force output device 10 of this embodiment can inhibit excessive internal stress from acting on either the reduction mechanism 14 between the interlocking arm 15 and the motor 12 or the motor 12.

In particular, in the case of the reaction force output device 10 of this embodiment, the torque limiting mechanism 18 is configured to be equipped with the gear part 17 of the interlocking arm 15, the action transmission lever 19 that is fixed to the reaction force output shaft 13, the rotary gear 21 that is rotatably supported on the support pin 22 projected from the action transmission lever 19 and is always engaged with the gear part 17, and the power spring 23 that connects the support pin 22 and the rotary gear 21, and is configured such that the power spring 23 is elastically deformed to allow the rotation of the rotary gear 21 when the torque acting on the rotary gear 21 via the gear part 17 is equal to or greater than the predetermined value.

That is, in the case of the reaction force output device 10 of this embodiment, the interlocking arm 15 has the pivotal part 15a that is pivotably supported on the reaction force output shaft 13, and the gear part 17 that is provided on a region separated from the pivotal part 15a. The torque limiting mechanism 18 is equipped with the action transmission lever 19 that is connected via the reaction force output shaft 13 to be rotatable relative to the interlocking arm 15, the rotary gear 21 that that is connected via the support pin 22 to be pivotable relative to the action transmission lever 19 and is always engaged with the gear part 17 of the interlocking arm 15, and the power spring 23 that is interposed between the action transmission lever 19 and the rotary gear 21 and is elastically deformed to allow the rotation of the rotary gear 21 relative to the action transmission lever 19 when the torque acting on the rotary gear via the gear part is equal to or greater than the predetermined value.

For this reason, the torque limiting mechanism 18 can inhibit excessive torque from being transmitted between the motor 12 and the interlocking arm 15 with a compact and simple structure.

Also, in this embodiment, the power spring 23 is used in the torque limiting mechanism 18 as a spring member that connects the support pin 22 and the rotary gear 21. However, the spring member used in the torque limiting mechanism 18 is not limited to the power spring 23, and it may be another spring member such as a coil spring. Provided that the power spring 23 is used as the spring member as in this embodiment, because the power spring 23 makes it easy to set a spring constant to be small compared to the coil spring, it is easy to greatly secure a pivoting stroke of the interlocking arm 15 relative to the reaction force output shaft 13 for the purpose of torque limitation. That is, in the power spring 23, when the rotating torque acting on the rotary gear 21 is equal to or greater than the predetermined value, a load does not abruptly increase with respect to the progress of the rotation of the rotary gear 21. For this reason, it is possible to easily increase the pivoting stroke of the interlocking arm 15 relative to the reaction force output shaft 13 for the purpose of limiting the transmission of the torque.

The present invention is not limited to the aforementioned embodiment, and changes in design are possible in various ways without departing from the spirit and scope of the present invention. For example, in the above embodiment, the reaction force output device is used in the accelerator pedal of the vehicle. However, the reaction force output device may also be applied to an operation pedal of the vehicle, an operation pedal of a simulation device, etc. in addition to the accelerator pedal.

REFERENCE SIGNS LIST 4 pedal arm (operation pedal)
5 pedal body part (operation pedal)
10 reaction force output device
12 motor
12a output shaft
13 reaction force output shaft
15 interlocking arm
17 gear part
18 torque limiting mechanism
19 action transmission lever
21 rotary gear
23 power spring (spring member)

The invention claimed is:

1. A reaction force output device that outputs a reaction force to an operation pedal, the reaction force output device comprising:
   a motor that is a drive source for generating the reaction force;
   a reaction force output shaft configured to interlock with an output shaft of the motor to rotate;
   an interlocking arm configured to transmit output torque of the motor, which is input to the reaction force output shaft, to the operation pedal;
   a sector gear supported on the reaction force output shaft; and
   a torque limiting mechanism, interposed between the reaction force output shaft and the interlocking arm and configured to limit transmission of torque, that is equal to or greater than a specified value, between the reaction force output shaft and the interlocking arm,
   wherein the interlocking arm comprises:
      a pivotal part pivotally supported on the reaction force output shaft;
      a gear part provided on a region separated from the pivotal part, and
   wherein the torque limiting mechanism comprises:

an action transmission lever connected via the reaction force output shaft to be rotatable relative to the interlocking arm, a rotary gear connected via a support shaft to be rotatable relative to the action transmission lever and always engaged with the gear part of the interlocking arm, and a spring member interposed between the action transmission lever and the rotary gear and elastically deformed to allow rotation of the rotary gear relative to the action transmission lever when torque acting on the rotary gear through the gear part is equal to or greater than a predetermined value, and wherein the sector gear and the pivotal part rotate about the reaction force output shaft.

2. The reaction force output device according to claim 1, wherein the spring member comprises a power spring.

3. The reaction force output device according to claim 1, wherein the action transmission lever and the rotary gear are connected via the support shaft and the spring member is connected to the support shaft.

4. The reaction force output device according to claim 1, wherein the spring member regulates the rotation of the rotary gear when the torque acting on the rotary gear through the gear part is less than the predetermined value.

5. The reaction force output device according to claim 1, wherein the motor is provided at a position different from a position on a direction connecting the gear part and the rotary gear.

\* \* \* \* \*